United States Patent
Watanabe

(12) 
(10) Patent No.: US 6,424,773 B1
(45) Date of Patent: Jul. 23, 2002

(54) OPTICAL GATE DEVICE, MANUFACTURING METHOD FOR THE DEVICE, AND SYSTEM INCLUDING THE DEVICE

(75) Inventor: Shigeki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/217,018

(22) Filed: Dec. 21, 1998

(30) Foreign Application Priority Data

Jun. 23, 1998 (JP) .......................................... 10-176316

(51) Int. Cl.$^7$ ................................................ G02B 6/00
(52) U.S. Cl. ............................ 385/122; 385/15; 385/32
(58) Field of Search ............................ 385/15, 16, 24, 385/31, 32, 95–97, 122

(56) References Cited

U.S. PATENT DOCUMENTS

| 5,357,359 A | * | 10/1994 | Uchiyama et al. | .......... 359/123 |
| 5,848,205 A | * | 12/1998 | Bigo | ............................ 385/15 |

OTHER PUBLICATIONS

Bigo et al., "All–Optical Fiber Signal Processing and Regeneration for Soliton Communications", IEEE Journal of Selected Topics in Quantum Electronics, vol. 3, No. 5, Oct. 1997, pp. 1208–1223.*
Holmes et al., "Highly Nonlinear Optical Fiber for All Optical Processing Applications", IEEE Photonics Technology Letters, vol. 7, No. 9, Sep. 1995, pp. 1045–1047.*
Olsson et al., "Polarization–independent all–optical AND–gate using randomly birefringent fiber in a nonlinear optical loop mirror", OFC '98, Technical Digest, Feb. 22–27, 1998, pp. 375–376.*
Onishi et al., "Highly Nonlinear Dispersion Shifted Fiber and Its Application to Broadband Wavelength Converter", ECOC 97, Sep. 22–25, 1997, Conference Publication No. 448, copywright IEE, 1997.*
Pastel et al., "High nonlinearity, low loss fiber for 1 pJ switching of 8–ps optical pulses", OFC '97, Technical Digest, Feb. 16–21, 1997, pp. 168–169.*
Rauschenbach et al., All–Optical Pulse Width and Wavelength Conversion at 10 Gb/s Using a Nonlinear Optical Loop Mirror.*
Watanabe et al., "Simultaneous Wavelength Conversion and Optical Phase Conjugation of 200 Gb/s (5×40 Gb/s) WDM Signal Using a Highly Nonlinear Fiber Four–wave Mixer", ECOC 97, Sep. 22–25, 1997, Conference Publication No. 448, copywright IEE 1997.*
M. Eiselt, "SLALOM: Semiconductor Laser Amplifier in a Loop Mirror", *Jnl. of Lightwave Technology*, vol. 13, No. 10 (Oct. 1995), pp. 2099–2112.

(List continued on next page.)

*Primary Examiner*—Akm E. Ullah
*Assistant Examiner*—Michelle R. Connelly-Cushwa
(74) *Attorney, Agent, or Firm*—Staas & Halsey LLP

(57) ABSTRACT

Disclosed herein is a device including first and second optical couplers and a loop optical path. The first optical coupler includes first and second optical paths directionally coupled to each other. The loop optical path includes an optical fiber as a nonlinear optical medium, and connects the first and second optical paths. The second optical coupler includes a third optical path directionally coupled to the loop optical path. The optical fiber has an enough large nonlinear coefficient. The wording of "enough large" means that the nonlinear coefficient is large enough to reduce the length of the optical fiber to such an extent that the optical fiber has a polarization maintaining ability. By using such an optical fiber having an enough large nonlinear coefficient, a relatively short optical fiber can be used as the nonlinear optical medium. Accordingly, it is possible to provide an optical gate device which can suppress a signal rate limit due to chromatic dispersion and can easily cope with polarization dependence of an input optical signal and polarization fluctuations in the loop optical path.

13 Claims, 11 Drawing Sheets

OTHER PUBLICATIONS

N.J. Doran, "Nonlinear–Optical Loop Mirror", *Optics Letters*, vol. 13, No. 1 (Jan. 1988), pp. 56–58.

S. Watanabe, "Simultaneous Wavelength . . . Four–Wave Mixer", *ECOC*, No. 448, (Sep. 1997), pp. 1–4.

Mikkelsen, "All–Optical Noise Reduction Capability of Interferometric Wavelength Converters", *Electronics Letters*, vol. 32, No. 6, (Mar. 1996), pp. 566–568.

M. Onishi, "Highly Nonlinear Dispersion Shifted Fiber & Its Application to Broadband Wavelength Converter", *ECOC*, No. 448, (Sep. 1997), pp. 115–118.

T. Durhuus, "All–Optical Wavelength Conversion by Semiconductor Optical Amplifiers", *Jnl. of Ligthwave Technology*, vol. 14, No. 6, (Jun. 1996), pp. 942–954.

K. Rauschenbach, "All–Optical Pulse Width & Wavelength Conversion at 10 Gb/s Using a Nonlinear Optical Loop Mirror", *IEEE Photonics Tech. Ltrs.*, vol. 6, No. 9 (Sep. 1994), pp. 1130–1132.

L. Spiekman, "All–Optical Mach–Zehnder Wavelength Converter with Monolithically Integrated DFB Probe Source", *IEEE Photonics Tech. Ltrs.*, vol. 9, No. 10, (Oct. 1997), pp. 1349–1351.

* cited by examiner

OPTICAL GATE DEVICE, MANUFACTURING METHOD FOR THE DEVICE, AND SYSTEM INCLUDING THE DEVICE

BACKGROUND OF THE INVENTION

1. Field of the Invention

The present invention relates to an optical gate device, a manufacturing method for the device, and a system including the device.

2. Description of the Related Art

A Mach-Zehnder interferometer (MZI) type optical gate is known as a conventional optical gate device. This optical gate is configured by integrating a Mach-Zehnder interferometer including first and second nonlinear optical media each for providing a phase shift on an optical waveguide substrate, for example. Probe light as continuous wave (CW) light is equally divided into two components, which are in turn supplied to the first and second nonlinear optical media. The optical path length of the interferometer is set so that output light is not obtained by interference of the two components of the probe light.

An optical signal is further supplied to one of the first and second nonlinear optical media. By properly setting the powers of the optical signal and the probe light, a converted optical signal synchronous with the optical signal is switched out from the optical gate. The converted optical signal has the same wavelength as that of the probe light.

It has been proposed to use a semiconductor optical amplifier (SOA) as each of the first and second nonlinear optical media. For example, an InGaAs-SOA having two (both) end faces treated with antireflection coatings is used as each nonlinear optical medium in a 1.5 $\mu$m band, and these nonlinear optical media are integrated on an InP/GaInAsP substrate to fabricate an optical gate.

A nonlinear optical loop mirror (NOLM) is known as another conventional optical gate device. The NOLM includes a first optical coupler including first and second optical paths directionally coupled to each other, a loop optical path for connecting the first and second optical paths, and a second optical coupler including a third optical path directionally coupled to the loop optical path.

By forming a part or the whole of the loop optical path from a nonlinear optical medium and supplying probe light and an optical signal respectively to the first optical path and the third optical path, a converted optical signal is output from the second optical path.

An optical fiber is generally used as the nonlinear optical medium in the NOLM. In particular, a NOLM using a SOA as the nonlinear optical medium is referred to as an SLA-LOM (Semiconductor Laser Amplifier in a Loop Mirror).

The MZI type optical gate is excellent in size reduction and integration, but its manufacturing technique has not yet been established.

The optical gate having an SOA as the nonlinear optical medium has a problem that amplified spontaneous emission (ASE) noise added by the SOA has an adverse effect on fundamental characteristics including a signal-to-noise ratio (SNR).

On the other hand, the NOLM requires a long fiber to obtain a required nonlinear optical effect. Accordingly, there arises a signal rate limit due to chromatic dispersion, and it is difficult to cope with polarization dependence of an input optical signal and polarization fluctuations in the loop optical path.

SUMMARY OF THE INVENTION

It is therefore an object of the present invention to provide an optical gate device allowing the use of a relatively short optical fiber as the nonlinear optical medium, and to also provide a manufacturing method for the device and a system including the device.

In accordance with an aspect of the present invention, there is provided a device including first and second optical couplers and a loop optical path. The first optical coupler includes first and second optical paths directionally coupled to each other. The loop optical path includes an optical fiber as a nonlinear optical medium, and connects the first and second optical paths. The second optical coupler includes a third optical path directionally coupled to the loop optical path. The optical fiber has an enough large nonlinear coefficient. The wording of "enough large" means that the nonlinear coefficient is large enough to reduce the length of the optical fiber to such an extent that the optical fiber has a polarization maintaining ability.

In the present invention, by using such an optical fiber having an enough large nonlinear coefficient, a relatively short optical fiber can be used as the nonlinear optical medium. Accordingly, it is possible to provide an optical gate device which can suppress a signal rate limit due to chromatic dispersion and can easily cope with polarization dependence of an input optical signal and polarization fluctuations in the loop optical path.

In accordance with another aspect of the present invention, there are provided first to third manufacturing methods for a device having a first optical coupler including first and second optical paths directionally coupled to each other, a nonlinear optical medium for forming a loop optical path connecting the first and second optical paths, and a second optical coupler including a third optical path directionally coupled to the loop optical path.

The first manufacturing method comprises the steps of (a) cutting an optical fiber into a plurality of sections, and (b) arranging the plurality of sections and joining them together so that a conversion band by a third-order nonlinear effect using the nonlinear optical medium becomes a maximum, thereby obtaining the nonlinear optical medium.

The second manufacturing method comprises the steps of (a) cutting an optical fiber into a plurality of sections, (b) measuring the dispersions of the plurality of sections, and (c) selecting any of the sections having dispersions small enough to obtain a required conversion band by a third-order nonlinear effect using the nonlinear optical medium and joining the selected sections, thereby obtaining the nonlinear optical medium.

The third manufacturing method comprises the steps of (a) measuring a deviation in zero-dispersion wavelength of an optical fiber, (b) cutting the optical fiber into a plurality of sections when the deviation exceeds a predetermined range, and making the deviation in zero-dispersion wavelength of each of the sections fall within the predetermined range, and (c) selecting the optical fiber or the sections having substantially the same zero-dispersion wavelength and joining the selected sections, thereby obtaining the nonlinear optical medium.

In accordance with a further aspect of the present invention, there is provided a system comprising an optical gate device, a probe light source, and first and second optical fiber transmission lines. The optical gate device comprises a first optical coupler including first and second optical paths directionally coupled to each other, a nonlinear optical medium for forming a loop optical path connecting the first and second optical paths, and a second optical coupler including a third optical path directionally coupled to the loop optical path. The probe light source is connected to the first optical path to supply probe light to the first optical path. The first optical fiber transmission line is connected to the third optical path to supply an optical signal to the third optical path. The second optical fiber transmission line is connected to the second optical path to transmit a converted optical signal output from the second optical path.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
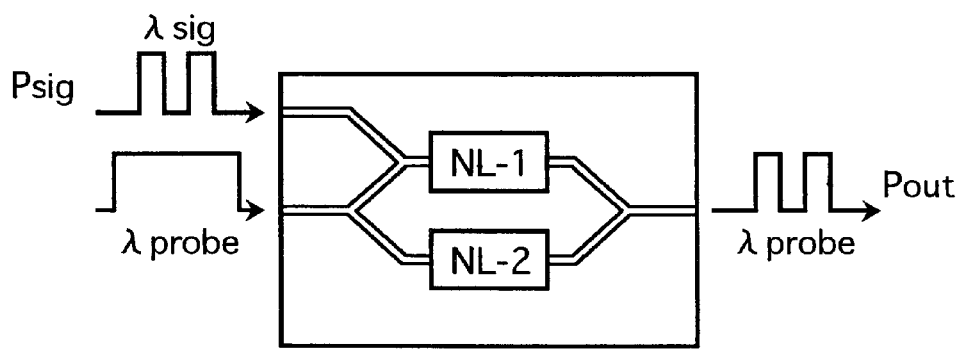
FIG. 1 is a diagram showing a configuration of an MZI type optical gate in the prior art.

Some preferred embodiments of the present invention will now be described in detail with reference to the attached drawings. Throughout the drawings, substantially the same parts are denoted by the same reference numerals.

Referring to FIG. 1, there is shown a configuration of an MZI type optical gate in the prior art. This optical gate has a Mach-Zehnder interferometer including two nonlinear optical media NL-1 and NL-2 each for providing a phase shift. Probe light having a wavelength λprobe is input equally into the nonlinear optical media NL-1 and NL-2. The probe light may be continuous wave (CW) light or optical pulses. In this example shown, the probe light is CW light.

An optical signal having a wavelength λsig is input asymmetrically into the nonlinear optical media NL-1 and NL-2. In this example, the optical signal is provided as optical pulses, and it is input into only the nonlinear optical medium NL-1. While the probe light and the optical signal are input in the same direction as shown, they may be input in opposite directions.

The nonlinear phase shifts of the probe light in the nonlinear optical media NL-1 and NL-2 while inputting the optical signal are set to become $\phi1$ and $\phi2$, respectively. By setting a suitable optical path length of the Mach-Zehnder interferometer, the intensity of a converted optical signal to be output from this optical gate is proportional to $[1-\cos(\phi1-\phi2)]/2$. The wavelength of the converted optical signal is equal to the wavelength of the probe light, i.e., equal to λprobe.

Assuming that an optical Kerr effect (cross-phase modulation (XPM) by the probe light and the optical signal) is used as the nonlinear effect, the phase shift $\phi$ is proportional to $(\gamma PL)^2$ where $\gamma$ is the nonlinear coefficient of each nonlinear optical medium, P is the optical power in each nonlinear optical medium, and L is the length of interaction of the optical Kerr effect in each nonlinear optical medium. Thus, the phase shift $\phi$ is proportional to the square of the optical power P, so that the input-output characteristic of the optical gate shown in FIG. 1 is as shown in FIG. 2.

Figure 2:
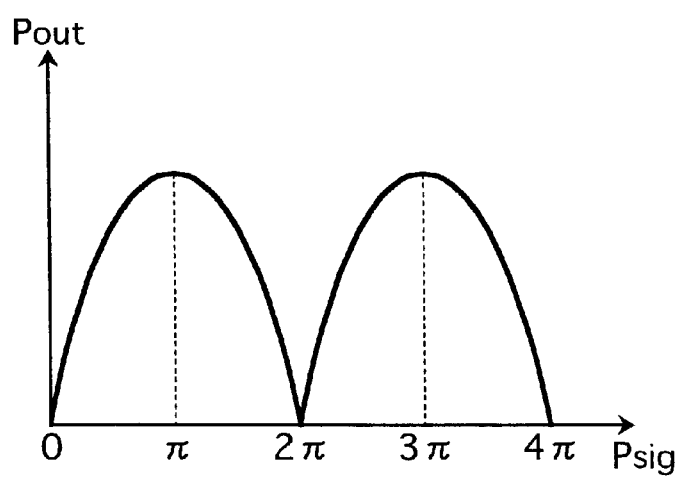
FIG. 2 is a graph showing an input-output characteristic of the optical gate shown in FIG. 1.

In FIG. 2, the vertical axis represents the power Pout of the converted optical signal, and the horizontal axis represents the power Psig of the input optical signal. The horizontal axis is marked with phase shifts corresponding to input powers. The power Pout of the converted optical signal takes on minimum values at $2n\pi$ (n is an integer) for the phase shift. As a result, the input optical signal can be converted into the converted optical signal. At this time, the wavelength is converted from λsig into λprobe (λprobe≠λsig).

In the wavelength conversion using the MZI type optical gate, the conversion is performed in the form proportional to $[1-\cos(\phi1-\phi2)]/2$. Accordingly, noise in the input optical signal can be partially suppressed.

Figure 3:
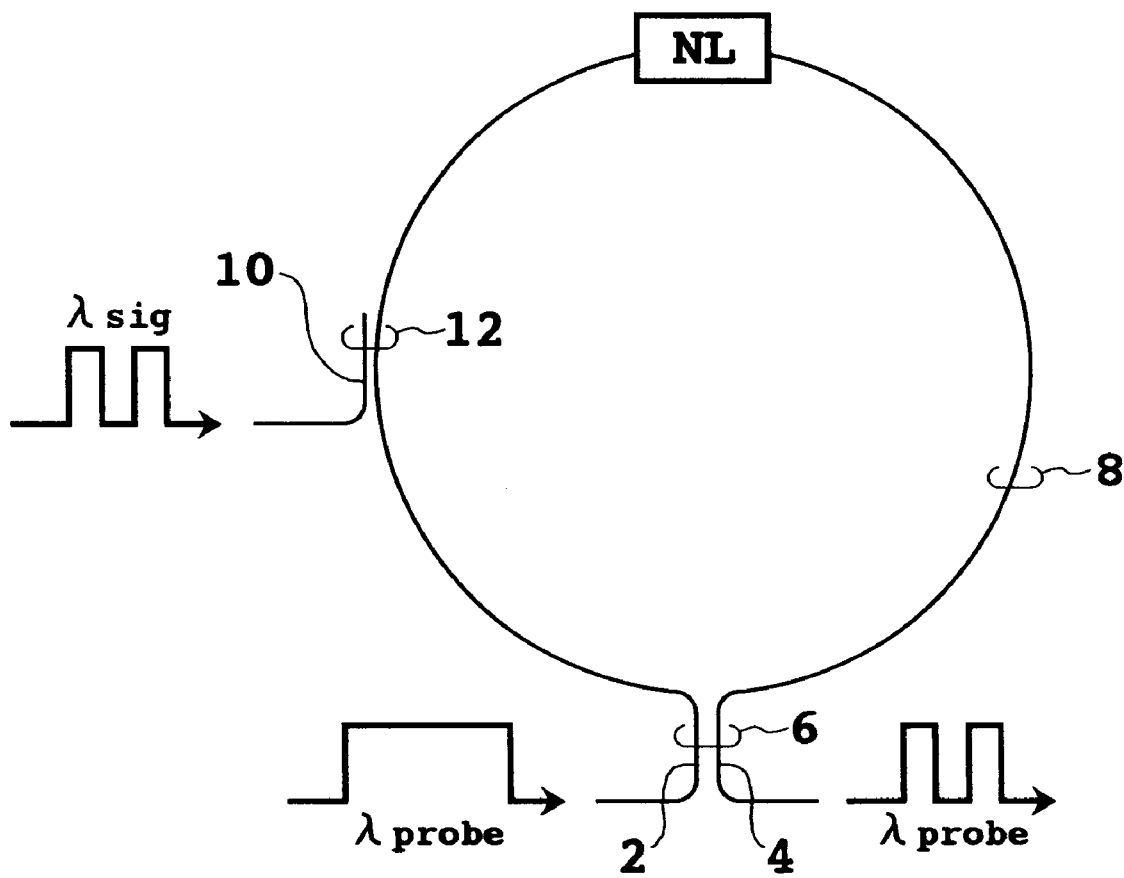
FIG. 3 is a diagram showing a configuration of an NOLM in the prior art.

Referring to FIG. 3, there is shown a configuration of an NOLM in the prior art. This NOLM includes a first optical coupler 6 including first and second optical paths 2 and 4 directionally coupled to each other, a loop optical path 8 for connecting the first and second optical paths 2 and 4, and a second optical coupler 12 including a third optical path 10 directionally coupled to the loop optical path 8. A part or the whole of the loop optical path 8 is provided by a nonlinear optical medium NL. The coupling ratio of the first optical coupler 6 is set to 1:1.

The operation of this NOLM will now be described in brief. When probe light having a wavelength λprobe is input into the first optical path 2 of the optical coupler 6 and an optical signal having a wavelength λsig is input into the third optical path 10 of the optical coupler 12, a converted optical signal having a wavelength λprobe is output from the second optical path 4 of the optical coupler 6.

The probe light is divided into two components having the same power by the optical coupler 6. The two components propagate in the loop optical path 8 clockwise and counterclockwise, respectively, and are next subjected to a phase shift $\phi$ for each by the nonlinear optical medium NL. Thereafter, they are combined by the optical coupler 6. In combining these components at the optical coupler 6, they are equal in power and phase to each other, so that resultant light obtained by this combination is output from the first optical path 2 but not output from the second optical path 4 as if it is reflected by a mirror.

When an optical signal is input from the middle of the loop optical path 8 by the optical coupler 12, this optical signal propagates in the loop optical path 8 in only one direction thereof (e.g., clockwise in FIG. 3), and the nonlinear refractive index of the nonlinear optical medium NL changes for the light propagating in this direction only when on-pulses pass therethrough. Accordingly, in combining the two components of the probe light at the optical coupler 6, the phases of the two components of the probe light at their portions synchronous with off-pulses of the optical signal are coincident with each other, and the phases of the two components of the probe light at their portions synchronous with on-pulses of the optical signal are different from each other. Letting $\Delta\phi$ denote a phase difference in the latter case, an output proportional to $[1-\cos(\Delta\phi)]/2$ is obtained from the second optical path 4 of the optical coupler 6.

By setting the power of the input optical signal so that the phase difference becomes $\pi$, it is possible to perform a switching operation such that the two components combined upon passing of the on-pulses are output only from the second optical path 4. Thus, the conversion from the optical signal having the wavelength $\lambda$sig into the converted optical signal having the wavelength $\lambda$probe is performed. Like the MZI type optical gate shown in FIG. 1, noise can be suppressed also in the NOLM shown in FIG. 3.

Figure 4:
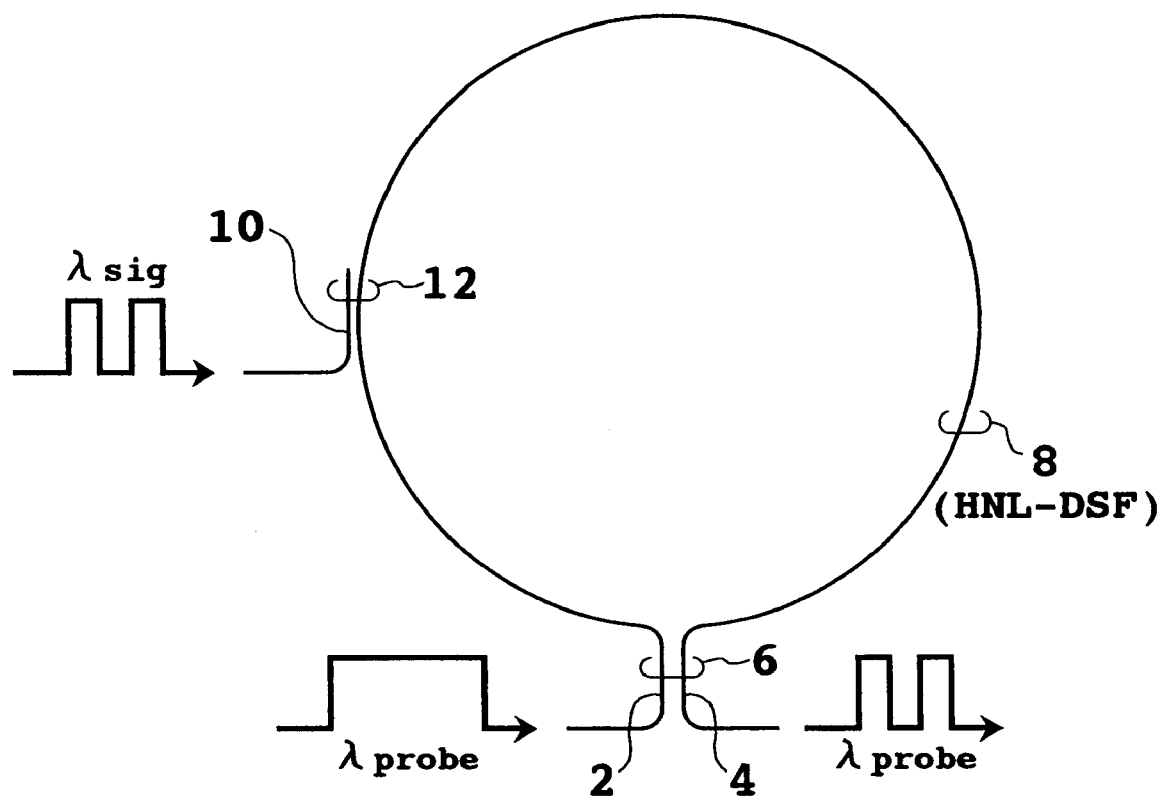
FIG. 4 is a diagram showing a first preferred embodiment of the NOLM according to the present invention.

FIG. 4 is a diagram showing a first preferred embodiment of the NOLM according to the present invention. According to the present invention, the loop optical path 8 is provided by an optical fiber as a nonlinear optical medium. The optical fiber has a nonlinear coefficient large enough to reduce the length of the optical fiber to such an extent that the optical fiber has a polarization maintaining ability, for example. Particularly in this preferred embodiment, the optical fiber forming the loop optical path 8 is provided by a highly-nonlinear dispersion-shifted fiber (HNL-DSF). With this configuration, it is possible to realize optical signal processing such as ultra high-speed and ultra wide-band wavelength conversion and optical 2R repeating using a noise suppressing function, in which "2R" means two functions of reshaping (waveform equalization) and reamplification (amplitude regeneration).

A switching operation by an optical signal in this preferred embodiment shown in FIG. 4 is similar to that described with reference to FIG. 3, so the description thereof will be omitted herein.

As a nonlinear optical effect applicable to optical signal processing in an optical communication system, it is considered to apply three-wave mixing in a second-order nonlinear optical medium or an optical Kerr effect such as self-phase modulation (SPM), cross-phase modulation (XPM), and four-wave mixing (FWM) in a third-order nonlinear optical medium. Examples of the second-order nonlinear optical medium include InGaAs and LiNbO3. Examples of the third-order nonlinear optical medium include an optical fiber and a semiconductor medium such as a semiconductor optical amplifier (SOA) and a distributed feedback laser diode (DFB-LD).

The present invention employs an optical Kerr effect in an optical fiber. A single-mode fiber is suitable as the optical fiber, and especially a dispersion-shifted fiber (DSF) having a relatively small chromatic dispersion is preferable.

In general, the third-order nonlinear coefficient $\gamma$ of an optical fiber is expressed as follows:

$$\gamma = \omega n_2 / c A_{\mathit{eff}} \quad (1)$$

where $\omega$ is the optical angular frequency, c is the velocity of light in a vacuum, and $n_2$ and $A_{\mathit{eff}}$ are the nonlinear refractive index and the effective core area of the optical fiber, respectively.

The nonlinear coefficient $\gamma$ of a conventional DSF is as small as about 2.6 $W^{-1}km^{-1}$, so a fiber length of several km to 10 km or more is necessary to obtain sufficient conversion efficiency. If a shorter DSF can be used to realize sufficient conversion efficiency, the zero-dispersion wavelength can be managed with high accuracy, thereby realizing high-speed and wide-band conversion.

In general, for enhancement of the third-order nonlinear effect of an optical fiber, it is effective to increase a light intensity by increasing the nonlinear refractive index $n_2$ in Eq. (1) or by reducing a mode field diameter (MFD) corresponding to the effective core area $A_{\mathit{eff}}$ in Eq. (1).

The nonlinear refractive index $n_2$ can be increased by doping the clad with fluorine or the like or by doping the core with a high concentration of $GeO_2$, for example. By doping the core with 25 to 30 mol % of $GeO_2$, a large value of $5\times10^{-20}$ $m^2/W$ or more (about $3.2\times10^{-20}$ $m^2/W$ for a usual silica fiber) can be obtained as the nonlinear refractive index $n_2$.

On the other hand, the MFD can be reduced by designing a relative refractive-index difference $\Delta$ between the core and the clad or by designing the core shape. Such design of a DSF is similar to that of a dispersion compensating fiber (DCF). For example, by doping the core with 25 to 30 mol % of $GeO_2$ and setting the relative refractive-index difference $\Delta$ to 2.5 to 3.0%, a small value of less than 4 $\mu$m can be obtained as the MFD. Owing to the combined effects of increasing the nonlinear refractive index $n_2$ and reducing the MFD, an optical fiber (HNL-DSF) having a large value of 15 $W^{-1}km^{-1}$ or more as the nonlinear coefficient $\gamma$ can be obtained.

As another important factor, the HNL-DSF having a large nonlinear coefficient $\gamma$ as mentioned above has a zero dispersion in a wavelength band used. This point can also be satisfied by setting each parameter in the following manner. That is, in general, a dispersion in a usual DCF increases in a normal dispersion region with an increase in refractive index difference $\Delta$ under the condition that the MFD is set constant. On the other hand, the dispersion decreases with an increase in core diameter, whereas the dispersion increases with a decrease in core diameter. Accordingly, the dispersion can be reduced to zero by increasing the core diameter under the condition that the MFD is set to a certain value in a wavelength band used.

A phase shift due to the optical Kerr effect in an optical fiber having a length L is proportional to $\gamma P_p L$ where $P_p$ is the average pump light power. Accordingly, the fiber having a nonlinear coefficient $\gamma$ of 15 $W^{-1}km^{-1}$ can achieve the same conversion efficiency as that by a usual DSF even when the fiber length is reduced to about $2.6/15\approx1/5.7$ as compared with the usual DSF. As mentioned above, the usual DSF requires a length of about 10 km for sufficient conversion efficiency. To the contrary, the HNL-DSF having a large nonlinear coefficient $\gamma$ as mentioned above can obtain a similar effect with a reduced length of about 1 to 2 km. Practically, loss in the fiber is reduced in an amount corresponding to a decrease in fiber length, so that the fiber can be further shortened to obtain the same efficiency. Thus in a short fiber, controllability of the zero-dispersion wavelength can be improved, and ultra wide-band conversion can be achieved as will be hereinafter described. Further, when the fiber length is several km, polarization can be fixed, that is, a polarization maintaining ability can be ensured. Therefore, application of the HNL-DSF to the present invention is greatly effective in achieving high conversion efficiency and wide conversion band and removing polarization dependence.

To effectively produce an optical Kerr effect, especially XPM by using an optical fiber and improve the efficiency of conversion from the optical signal into the converted optical signal, phase matching between the probe light and the optical signal must be achieved. The phase matching will now be described with reference to FIG. 5.

Figure 5:
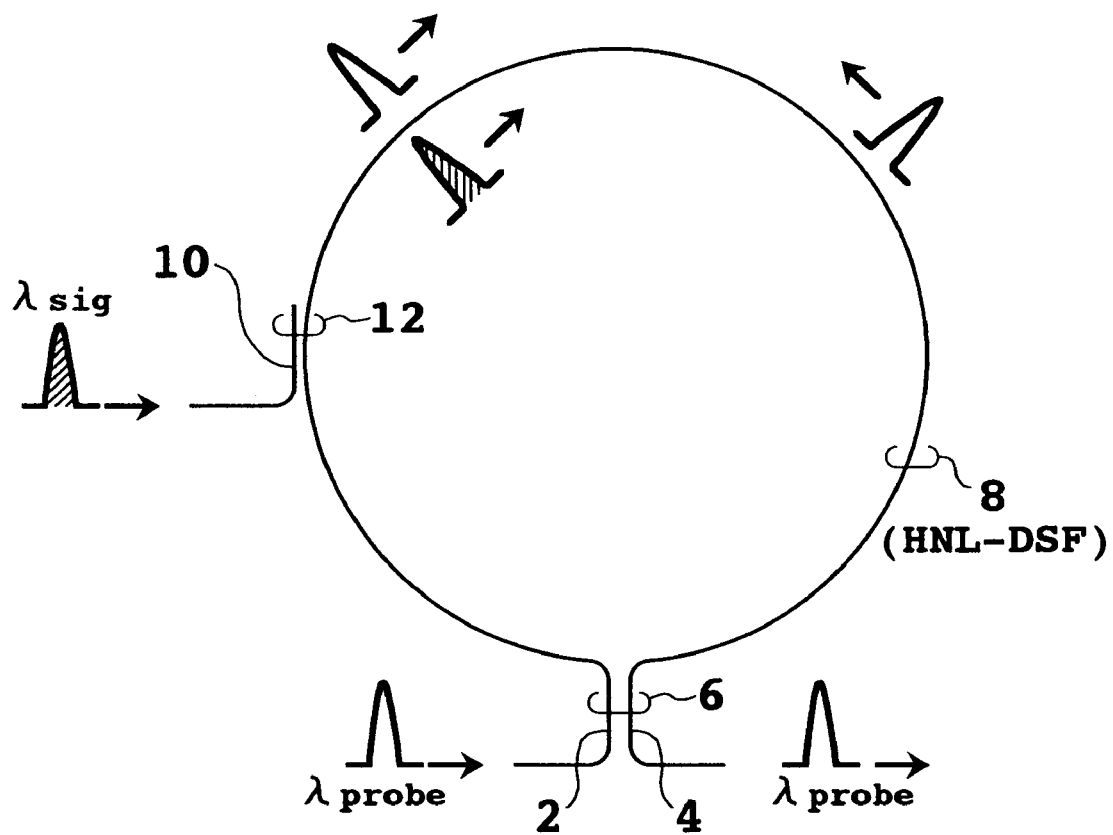
FIG. 5 is a diagram for illustrating phase matching in the first preferred embodiment shown in FIG. 4.

FIG. 5 is a diagram for illustrating the phase matching in the first preferred embodiment shown in FIG. 4. It is now assumed that both the probe light having a wavelength $\lambda$probe supplied to the optical path 2 and the optical signal having a wavelength $\lambda$sig supplied to the optical path 10 are optical pulses. The optical pulses as the probe light are branched to first probe pulses propagating clockwise in the loop optical path 8 and second probe pulses propagating counterclockwise in the loop optical path 8 by the optical coupler 6. The optical pulses as the optical signal are passed through the optical coupler 12 and propagate clockwise as signal pulses in the loop optical path 8.

A phase matching condition in the loop optical path 8 is given by timing coincidence of the signal pulses and the first probe pulses both propagating clockwise in the loop optical path 8. If the timing coincidence of the signal pulses and the first probe pulses is not achieved, optical Kerr shift by XPM is limited to cause a difficulty of effective switch operation or gate operation.

Since the wavelength of the signal pulses and the wavelength of the first probe pulses are different from each other, the group velocity of the signal pulses and the group velocity of the first probe pulses are different from each other, resulting in occurrence of timing deviation proportional to the length of the loop optical path 8. To avoid this possibility, wavelength location is preferably selected so that the group velocity of the signal pulses and the first probe pulses become equal to each other.

The most effective wavelength location for minimizing the timing deviation is obtained by locating the wavelength of the signal pulses and the wavelength of the first probe pulses in substantially symmetrical relationship with respect to the zero-dispersion wavelength of the loop optical path 8. Over a wide band near the zero-dispersion wavelength, the chromatic dispersion changes substantially linearly, so that a good phase matching condition can be obtained by making the group velocities of the signal pulses and the first probe pulses coincide with each other by the above-mentioned wavelength location.

Thus according to an aspect of the present invention, the phase matching condition can be obtained by satisfying the relation of $\lambda$sig+$\lambda$probe=$2\lambda_0$ where $\lambda_0$ is the zero-dispersion wavelength of the loop optical path, thus improving the efficiency of conversion from the optical signal into the converted optical signal.

However, if there are variations in the zero-dispersion wavelength itself along the fiber, the group velocities become different from each other in spite of the above wavelength location, causing a limit to a conversion band and a convertible signal rate. Thus, a conversion band by the fiber is limited by dispersion. If dispersion along the fiber is perfectly controlled, for example, if a fiber having a zero-dispersion wavelength uniform over the entire length (exactly, the nonlinear length) is fabricated, a conversion band infinite in fact (unlimitedly wide in a range where the wavelength dependence of dispersion is linear) could be obtained by locating the wavelengths of the probe light and the optical signal in symmetrical relationship with respect to this uniform zero-dispersion wavelength. Actually, however, the zero-dispersion wavelength varies along the fiber, causing a deviation of the phase matching condition from an ideal condition to result in a limit of the conversion band.

A first method for realizing a wide conversion band is to use an HNL-DSF. In the case that the HNL-DSF is used, sufficient conversion can be achieved with a length of about 1 to 2 km, so that dispersion controllability can be improved to easily obtain a wide-band characteristic. In particular, by suppressing variations in the zero-dispersion wavelength near an input end where the efficiency of production of an optical Kerr effect is high, the conversion band can be widened most efficiently. Further, by cutting the fiber into a plurality of small sections and next joining any of the small sections similar in zero-dispersion wavelength by splicing or the like (in an order different from the initial order counted from a fiber end), a wide conversion band can be obtained although an average dispersion over the entire length is unchanged.

Alternatively, many fibers each having a length (e.g., hundreds of meters or less) allowing high-accuracy dispersion control required to obtain a sufficiently wide conversion band may be prepared in advance, and any of these fibers having a required zero-dispersion wavelength may be combined to be spliced, thereby fabricating a fiber having a length required to obtain a required conversion efficiency.

In the case of widening the conversion band as mentioned above, it is effective to gather the sections of the fiber having less variations in zero-dispersion wavelength near an input end (e.g., both ends of a nonlinear optical medium) where the light intensity is high. Further, the conversion band can be further widened by increasing the number of sections of the fiber as required, or by alternately arranging the positive and negative signs of dispersion at a relatively large-dispersion portion separate from the input end to thereby suitably combine the small sections.

The degree of reducing the length of each section in cutting the optical fiber may be based on the nonlinear length, for example. The phase matching in FWM in a fiber sufficiently shorter than the nonlinear length may be considered to depend on the average dispersion of the fiber. As an example, in FWM using a pump light power of about 30 mW in a fiber having a nonlinear coefficient $\gamma$ of 2.6 $W^{-1}km^{-1}$, the nonlinear length is about 12.8 km. In this example, the length of each section is set to about $\frac{1}{10}$ of 12.8 km, i.e., about 1 km. As another example, in FWM using a pump light power of about 30 mW in a fiber having a nonlinear coefficient $\gamma$ of 15 $W^{-1}km^{-1}$, the nonlinear length is about 2.2 km. In this example, the length of each section is set to about $\frac{1}{10}$ of 2.2 km, i.e., about 200 m. In any case, a wide conversion band can be obtained by measuring an average zero-dispersion wavelength of fiber sections each sufficiently shorter than the nonlinear length and combining any of the fiber sections having almost the same zero-dispersion wavelength to thereby configure a fiber achieving a required conversion efficiency.

Thus according to the present invention, there is provided a first method for manufacturing an NOLM having a nonlinear optical medium to obtain the function of an optical gate. In this method, an optical fiber is first cut into a plurality of sections, and the plural sections are next arranged to be joined together so that a conversion band by a third-order nonlinear effect using a nonlinear optical medium becomes maximum, thereby obtaining the nonlinear optical medium. This nonlinear optical medium is used to configure an NOLM, and probe light is used to convert an optical signal into a converted optical signal, thereby obtaining a wide conversion band.

Preferably, dispersions of the plural sections are measured, and the plural sections are arranged so that any of these sections having less variations in zero-dispersion wavelength are located near the input and output ends of the nonlinear optical medium. With this configuration, a phase matching condition can be effectively obtained at a fiber portion where optical power is high, so that the conversion band can be effectively widened.

Preferably, at least a part of the plural sections is joined so that the positive and negative signs of dispersion are alternately arranged. With this configuration, the average dispersion of each part of the optical fiber can be suppressed to thereby effectively widen the conversion band.

Further, according to the present invention, there is provided a second method for manufacturing an NOLM having a nonlinear optical medium to obtain the function of an optical gate. In this method, an optical fiber is first cut into a plurality of sections, and a dispersion of each of the plural sections is next measured. Thereafter, any of the plural sections having dispersions small enough to obtain a required conversion band by a third-order nonlinear effect using a nonlinear optical medium are selected and joined together to thereby obtain the nonlinear optical medium. This nonlinear optical medium is used to configure an NOLM, and probe light is used to convert an optical signal into a converted optical signal, thereby obtaining a wide conversion band.

While the optical fiber is first cut into a plurality of sections in each of the first and second methods according to the present invention, the present invention is not limited to this technique. For example, the optical fiber may be cut as required in the following manner.

According to the present invention, there is provided a third method for manufacturing an NOLM having a nonlinear optical medium to obtain the function of an optical gate. In this method, a deviation in zero-dispersion wavelength of an optical fiber is measured, and in the case that the measured deviation exceeds a predetermined range, the optical fiber is cut into a plurality of sections to make a deviation in zero-dispersion wavelength of each section fall within the predetermined range. Thereafter, the optical fiber or the sections having substantially the same zero-dispersion wavelength is/are selected to be joined together, thereby obtaining a nonlinear optical medium. This nonlinear optical medium is used to configure an NOLM, and probe light is used to convert an optical signal into a converted optical signal, thus obtaining a wide conversion band.

The measurement of the zero-dispersion wavelength may be performed by using the fact that the efficiency of generation of FWM differs according to the zero-dispersion wavelength, for example. In general, chromatic dispersion can be obtained by measuring the wavelength dependence of group velocity, and the best phase matching condition in FWM is obtained when a pump light wavelength and a zero-dispersion wavelength coincide with each other. Accordingly, the zero-dispersion wavelength can be obtained as a pump light wavelength giving a maximum efficiency of generation of FWM by measuring the efficiency of generation of FWM to the pump light wavelength in the condition that a wavelength difference between pump light and signal light is set to a relatively large constant value of about 10 to 20 nm, for example.

Further, the efficiency of generation of FWM is proportional to the square of pump light intensity. Accordingly, in the case that the zero-dispersion wavelength varies along an optical fiber, the zero-dispersion wavelength measured in the case that signal light and pump light are input into the optical fiber from its one end is generally different from that measured in the case that they are input into the optical fiber from its other end. Accordingly, a deviation in zero-dispersion wavelength of the optical fiber can be obtained according to these two different measured values of the zero-dispersion wavelength. This will now be described more specifically.

Figure 6:
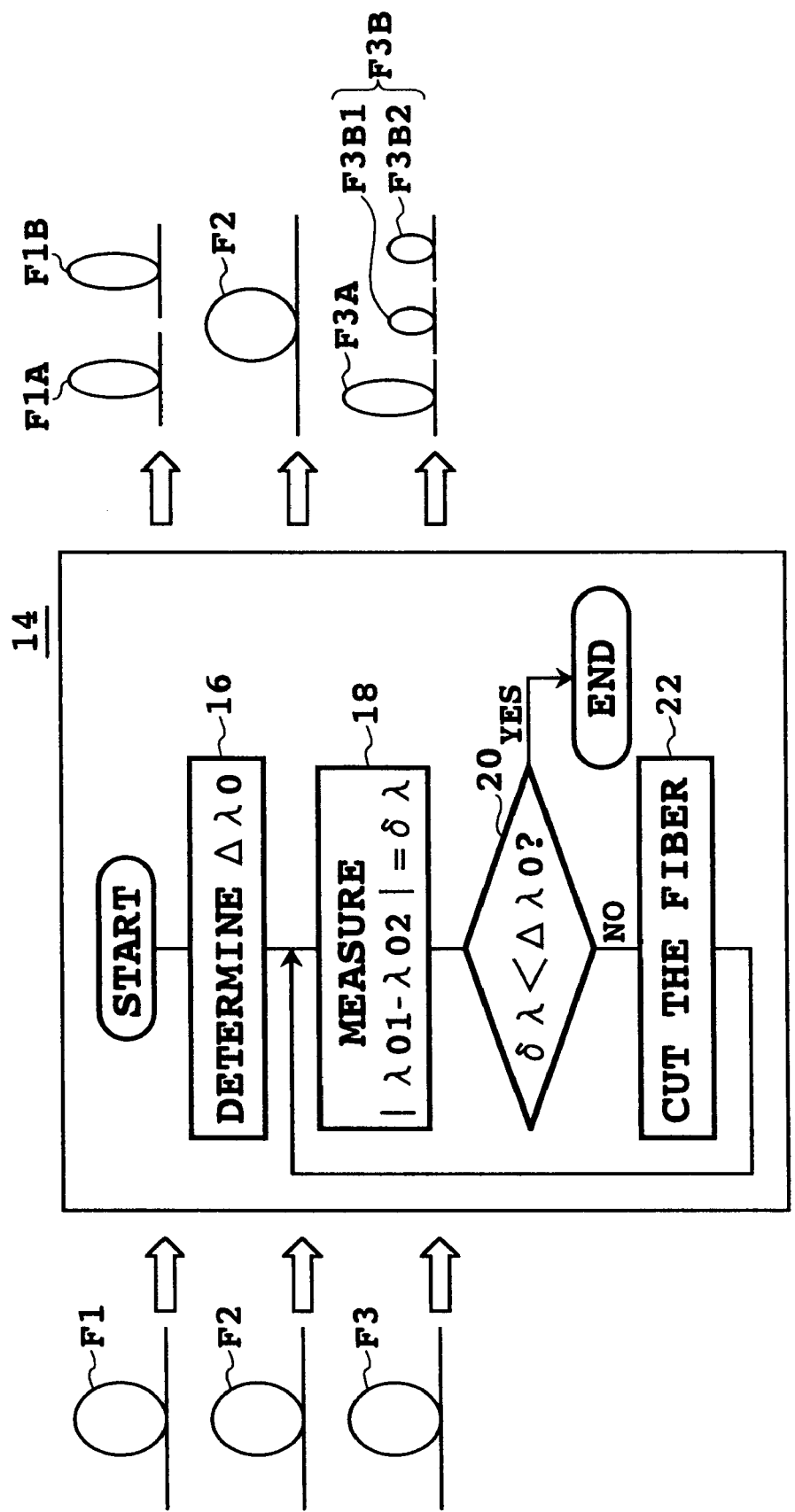
FIG. 6 is a flowchart showing a preferred embodiment of the method according to the present invention.

Referring to FIG. 6, there is shown a process 14 for manufacturing a nonlinear optical medium having a small deviation in zero-dispersion wavelength. In step 16, a tolerance $\Delta\lambda_0$ of zero-dispersion wavelength is determined. The tolerance $\Delta\lambda_0$ may be determined as a characteristic required by a system from a required conversion band, and its specific value is 2 nm, for example.

In step 18, a deviation $\delta\lambda$ in zero-dispersion wavelength is measured. For example, when an optical fiber F1 is given, a zero-dispersion wavelength $\lambda_{01}$ obtained in the case of inputting signal light and pump light into the optical fiber F1 from its first end and a zero-dispersion wavelength $\lambda_{02}$ obtained in the case of inputting signal light and pump light into the optical fiber F1 from its second end are measured from the efficiency of generation of FWM as mentioned above. In this case, the deviation $\delta\lambda$ in zero-dispersion wavelength can be replaced by a value of $|\lambda_{01} 31 \lambda_{02}|$.

In step 20, it is determined whether or not the deviation $\delta\lambda$ is smaller than the tolerance $\Delta\lambda_0$. Assuming that the relation of $\Delta\lambda_0 \leq \delta\lambda$ is satisfied in the optical fiber F1, the optical fiber F1 is cut into two optical fibers F1A and F1B in step 22.

After step 22, the flow returns to step 18, in which a deviation $\delta\lambda$ in each of the optical fibers F1A and F1B is measured. Thereafter, the decision is made for each measured value in step 20. Assuming that each measured value of the deviation $\delta\lambda$ is smaller than $\Delta\lambda_0$ in the optical fibers F1A and F1B, this flow is ended. A cutting position of the optical fiber F1 in step 22 is arbitrary. Accordingly, the lengths of the optical fibers F1A and F1B may be equal to each other or different from each other.

While steps 18 and 20 are once repeated in the above description, steps 18 and 20 may not be repeated or may be repeated more times. For example, in the case that an optical fiber F2 having a small deviation in zero-dispersion wavelength is given, the condition is satisfied in step 20 of the first cycle. In this case, the optical fiber F2 is not cut. Conversely, in the case that an optical fiber F3 having large variations in zero-dispersion wavelength along the fiber is given, the optical fiber F3 is cut into two optical fibers F3A and F3B in step 22 of the first cycle. In the case that the optical fiber F3A satisfies the condition in step 20 of the second cycle, but the optical fiber F3B does not satisfy the condition in step 20 of the second cycle, the optical fiber F3B is cut into two optical fibers F3B1 and F3B2 in step 22 of the second cycle. Then, the process 14 is ended. In this case, the three optical fibers F3A, F3B1, and F3B2 are obtained from the original optical fiber F3, so that the deviation in zero-dispersion wavelength of each fiber is smaller than the tolerance $\Delta\lambda_0$.

The plural optical fiber sections (the optical fibers F1A, F1B, and so on) thus obtained are arranged according to the measured values of the zero-dispersion wavelength, and any of the optical fibers having substantially the same zero-dispersion wavelength are selected and jointed together to obtain a length giving a required conversion efficiency, thus obtaining a nonlinear optical medium having greatly reduced variations in zero-dispersion wavelength along the fiber. This nonlinear optical medium is used to configure an NOLM, thus obtaining a wide conversion band.

Although the zero-dispersion wavelengths $\lambda_{01}$ and $\lambda_{02}$ are substantially equal to each other, the optical fiber may have large variations in zero-dispersion wavelength along the fiber. For example, there is a case that the distribution of the zero-dispersion wavelength along the fiber is symmetrical with respect to the longitudinal center of the fiber. In this case, the optical fiber is cut into at least two sections prior to starting of the process 14. Then, the process 14 is carried out for each section. Alternatively, the process 14 may be repeated plural times.

As mentioned above, it is effective to set the zero-dispersion wavelength of a fiber and the wavelength of pump light substantially equal to each other for the generation of FWM. However, if the power of pump light, signal light, or converted light exceeds a threshold value of stimulated Brillouin scattering (SBS) in the fiber, the efficiency of generation of FWM is reduced. To suppress the effect of SBS, the pump light or signal light is subjected to frequency modulation or phase modulation. In such modulation, a modulating rate of hundreds of kHz is good enough, and in the case that the signal light is a high-speed signal having a signal rate on the order of Gb/s, the modulation has almost no adverse effect on the signal light.

In the preferred embodiment shown in FIG. 4, the loop optical path 8 is configured from an HNL-DSF. In the HNL-DSF, its third-order nonlinear coefficient can be increased 5 to 10 times that of a conventional DSF, so that the product of the length and an optical power required to set the phase difference $\Delta\phi$ to $\pi$ can be reduced to $\frac{1}{5}$ to $\frac{1}{10}$. Accordingly, a required length for the same signal power can be reduced to $\frac{1}{5}$ to $\frac{1}{10}$, with the result that a sufficient characteristic can be obtained with a reduced length of 1 km or less. As a result, it is possible to provide an NOLM which can suppress a signal rate limit due to chromatic dispersion, can eliminate the polarization dependence of an input optical signal, and can eliminate the need for measures against polarization fluctuations in the loop optical path 8.

Figure 7:
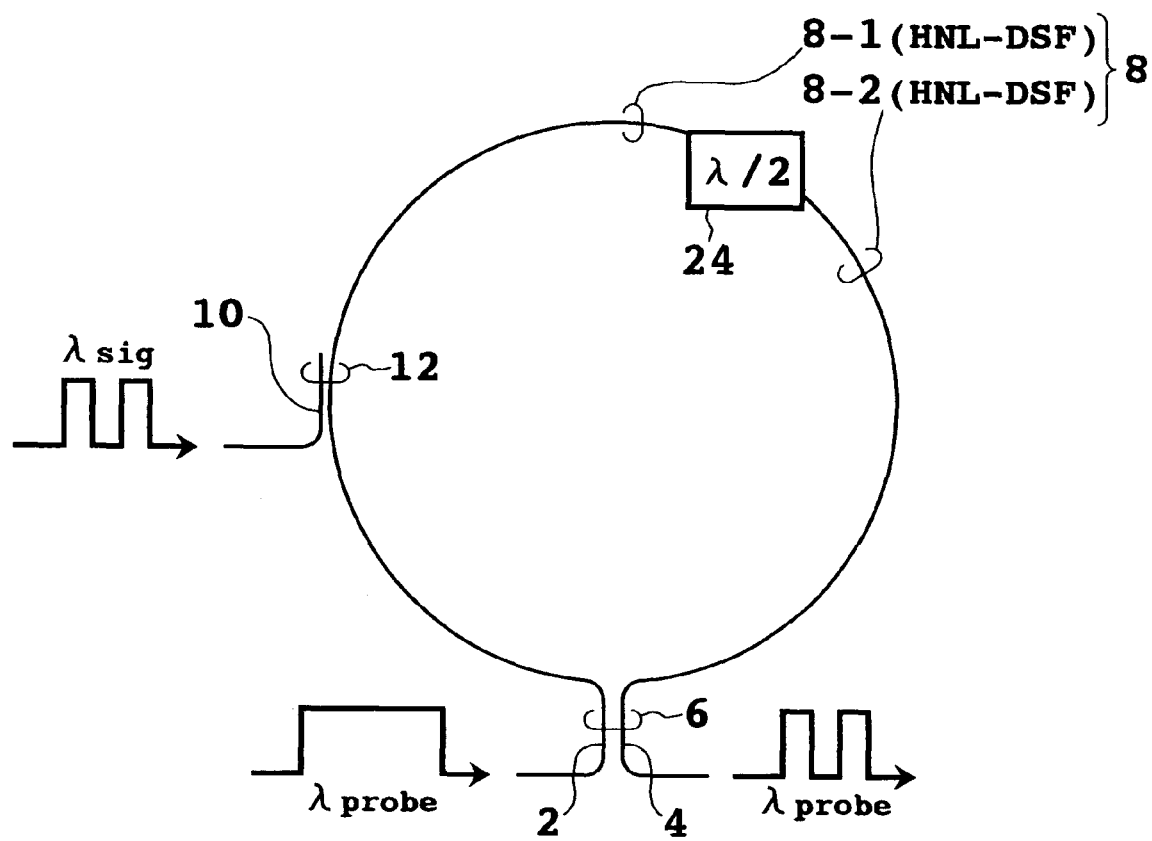
FIG. 7 is a diagram showing a second preferred embodiment of the NOLM according to the present invention.

FIG. 7 is a diagram showing a second preferred embodiment of the NOLM according to the present invention. In this preferred embodiment, the loop optical path 8 is composed of half portions 8-1 and 8-2 each giving a phase shift $\Delta\phi/2$. Each of the half portions 8-1 and 8-2 is configured from an HNL-DSF of polarization maintaining fiber (PMF) type. The total phase shift given by both of the half portions 8-1 and 8-2 becomes $\Delta\phi$, thereby obtaining the function of an optical gate as in the preferred embodiment shown in FIG. 4.

Particularly in this preferred embodiment, a $\lambda/2$ plate function 24 for orthogonally intersecting polarization states is added at the midpoint of the loop optical path 8, i.e., at a connection point between the half portions 8-1 and 8-2. The $\lambda/2$ plate function 24 can be obtained by splicing the half portions 8-1 and 8-2 in such a manner that the principal axes of the half portions 8-1 and 8-2 orthogonally intersect each other. With this configuration, the conversion efficiency does not depend on the polarization state of an input optical signal. Furthermore, the addition of the $\lambda/2$ plate function 24 allows suppression of polarization mode dispersion due to different group velocities of two polarization modes of each polarization maintaining fiber. More specifically, by 45° inclining the polarization plane of probe light to be introduced through the optical coupler 6 into the loop optical path 8 with respect to the principal axis of each polarization maintaining fiber, it is possible to obtain a conversion efficiency not depending upon the polarization state of an optical signal to be introduced through the optical coupler 12 into the loop optical path 8.

The conversion efficiency is defined as a ratio between the power of an input optical signal to be introduced through the optical coupler 12 into the loop optical path 8 and the power of a converted optical signal to be taken from the loop optical path 8 through the optical coupler 6.

Figure 8:
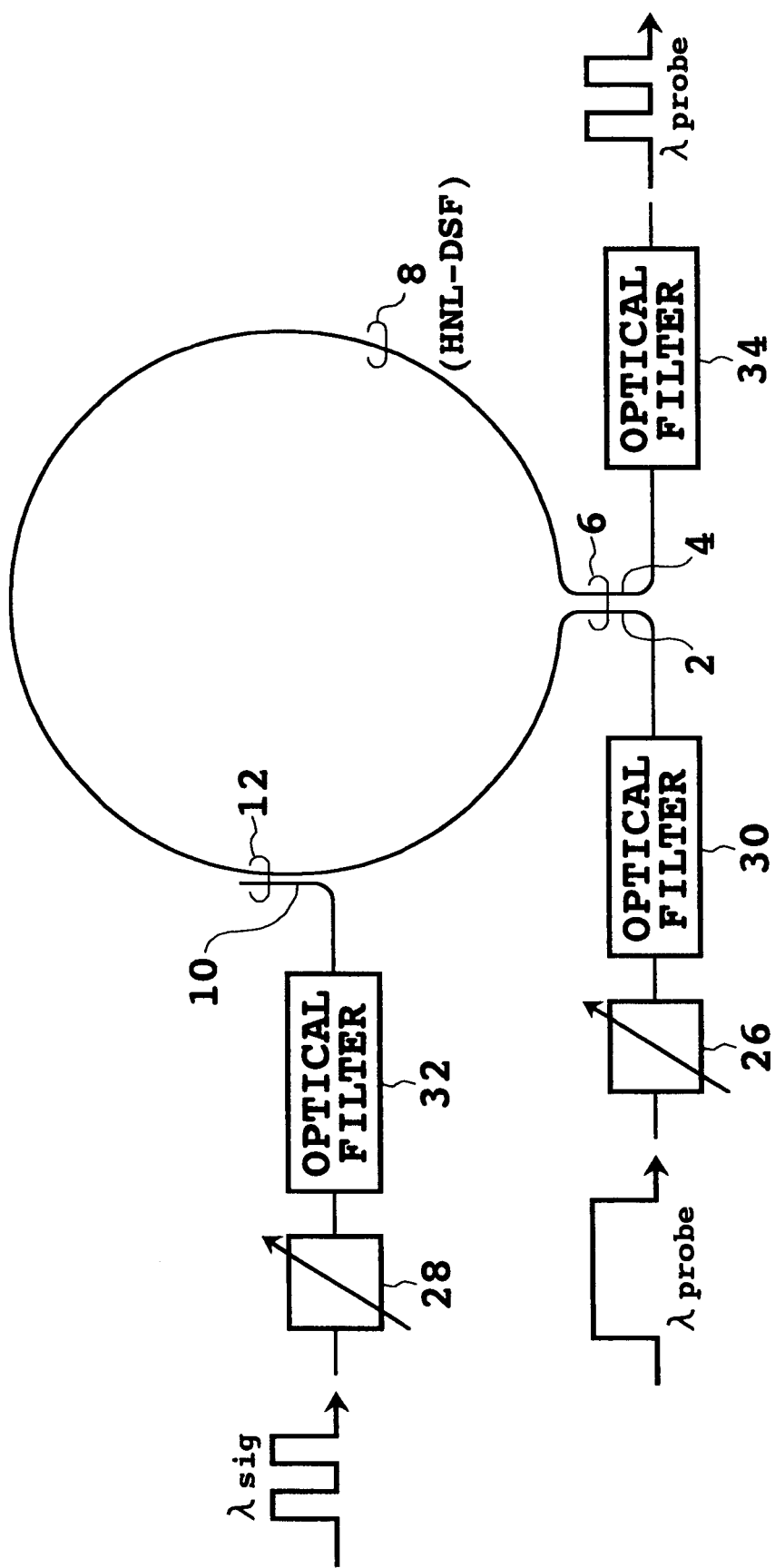
FIG. 8 is a diagram showing a third preferred embodiment of the NOLM according to the present invention.

FIG. 8 is a diagram showing a third preferred embodiment of the NOLM according to the present invention. Since the operation of an optical gate in the NOLM depends on the magnitude of a phase shift in an optical Kerr effect, especially, XPM, it is preferable to make adjustable the powers of an input optical signal and probe light to be introduced into the loop optical path 8. In this respect, this preferred embodiment employs a power controller 26 for adjusting the power of the probe light and a power controller 28 for adjusting the power of the input optical signal. A variable optical attenuator or an optical amplifier having a variable gain may be used as each of the power controllers 26 and 28.

Further, optical filters 30, 32, and 34 are used to suppress noise light outside the band of the probe light, signal light, or converted light. The optical filter 30 is provided between the power controller 26 and the first optical path 2 of the optical coupler 6 to act on the probe light to be introduced through the optical coupler 6 into the loop optical path 8. An optical bandpass filter having a pass band including the wavelength $\lambda$probe of the probe light may be used as the optical filter 30.

The optical filter 32 is provided between the power controller 28 and the third optical path 10 of the optical coupler 12 to act on the input optical signal to be introduced through the optical coupler 12 into the loop optical path 8. An optical bandpass filter having a pass band including the wavelength $\lambda$sig of the input optical signal or an optical band-rejection filter having a rejection band including the wavelength $\lambda$probe of the probe light may be used as the optical filter 32. The reason why the SNR of the converted optical signal is improved also in the case of using such an optical band-rejection filter is such that since an optical signal to be subjected to optical gate processing generally accompanies ASE noise due to transmission, the SNR can be improved by preliminarily removing the ASE noise near the wavelength $\lambda$probe of the converted optical signal.

The optical filter 34 is connected to the second optical path 4 of the optical coupler 6 to act on the converted optical signal output from the loop optical path 8 through the optical coupler 6. The optical filter 34 may be provided by an optical bandpass filter having a pass band including the wavelength $\lambda$probe of the converted optical signal or by an optical band-rejection filter having a rejection band including the wavelength $\lambda$sig of the input optical signal. The center wavelength in the pass band or the rejection band of each filter is coincident with the center wavelength of the probe light or the center wavelength of the input optical signal. The width of the pass band or the rejection band of each filter is substantially equal to or slightly greater than that of the band of the input optical signal. Specific examples of each filter include a dielectric multilayer filter and a fiber grating filter.

Figure 9:
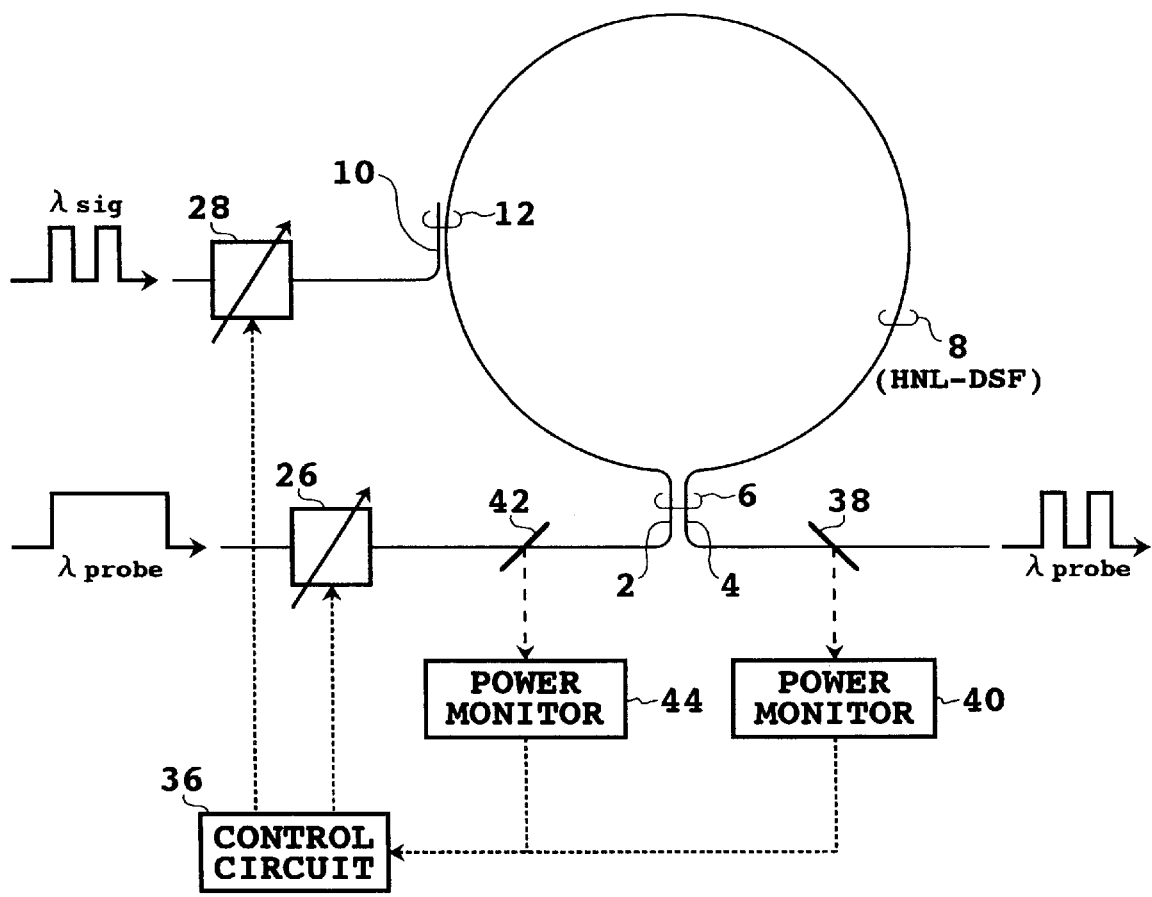
FIG. 9 is a diagram showing a fourth preferred embodiment of the NOLM according to the present invention.

FIG. 9 is a diagram showing a fourth preferred embodiment of the NOLM according to the present invention. In this preferred embodiment, a power controller 26 for adjusting the power of probe light and a power controller 28 for adjusting the power of an input optical signal are automatically controlled by a control circuit 36. For example, the control circuit 36 controls at least one of the power controllers 26 and 28 according to an output signal from a power monitor 40 for receiving a part of a converted optical signal which part is extracted from the second optical path 4 of the optical coupler 6 by an optical coupler 38 so that the power of the converted optical signal detected by the power monitor 40 is increased.

Alternatively, the control circuit 36 may control at least one of the power controllers 26 and 28 according to an output signal from a power monitor 44 for receiving a part of light output from the first optical path 2 of the optical coupler 6 in a direction opposite to the propagation direction of the probe light by an optical coupler 42 so that the power detected by the power monitor 44 is reduced.

With this configuration, the power of at least one of the input optical signal and the probe light can be controlled so that a proper phase difference is produced in the loop optical path 8. Accordingly, a high conversion efficiency can be automatically maintained.

Figure 10:
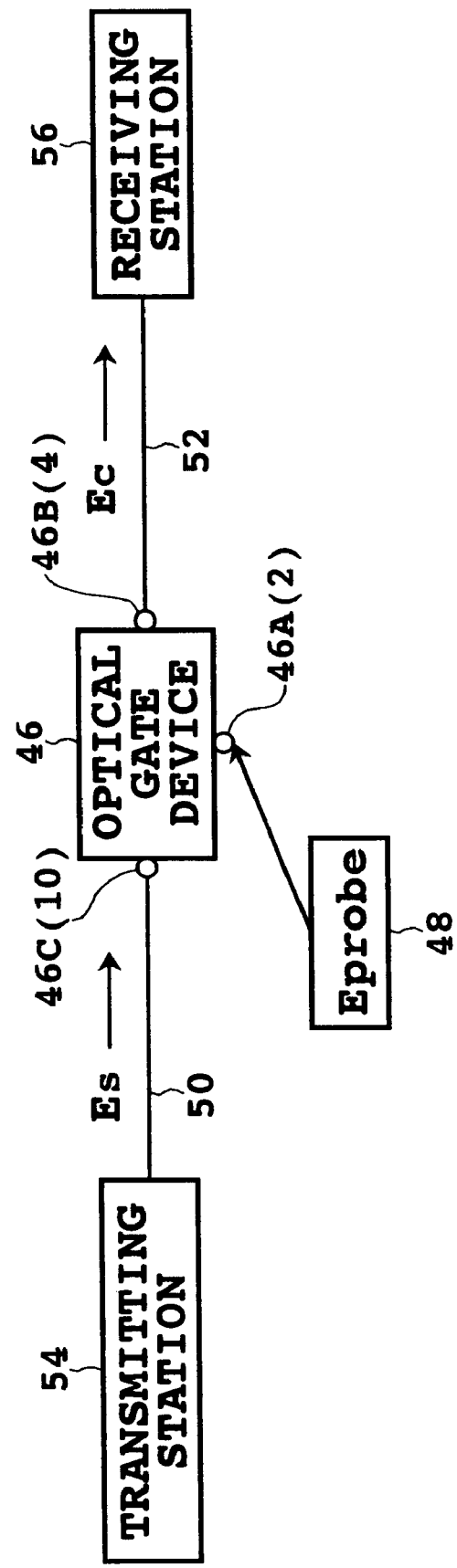
FIG. 10 is a block diagram showing a first preferred embodiment of the system according to the present invention.

FIG. 10 is a block diagram showing a first preferred embodiment of the system according to the present invention. This system has an optical gate device 46. The optical gate device 46 may be provided by any one of the above preferred embodiments of the NOLM according to the present invention. The optical gate device 46 has an input port 46A for probe light, an output port 46B for a converted optical signal, and an input port 46C for an input optical signal. The ports 46A, 46B, and 46C correspond to the first, second, and third optical paths 2, 4, and 10 shown in FIG. 4, respectively, for example. A probe light source 48 is connected to the port 46A, and probe light Eprobe output from the probe light source 48 is supplied to the optical gate device 46. A first optical fiber transmission line 50 is connected to the port 46C, and an optical signal Es transmitted by the optical fiber transmission line 50 is supplied to the optical gate device 46. A second optical fiber transmission line 52 is connected to the port 46B, and a converted optical signal Ec output from the optical gate device 46 is transmitted by the second optical fiber transmission line 52.

Particularly in this preferred embodiment, a transmitting station 54 is provided to supply the optical signal Es to the first optical fiber transmission line 50, and a receiving station 56 is provided to receive the converted optical signal Ec transmitted by the second optical fiber transmission line 52.

As a modulating method for an optical signal in the transmitting station 54, optical amplitude (intensity) modulation is adopted, for example. In this case, direct detection may be adopted as demodulation in the receiving station 56, for example.

Each of the optical fiber transmission lines 50 and 52 may be provided by a single-mode fiber, 1.3-$\mu$m zero-dispersion fiber, or 1.55-$\mu$m dispersion-shifted fiber.

By configuring an HNL-DSF used as a nonlinear optical medium in the optical gate device 46 into a single-mode type and setting the mode field diameter of the HNL-DSF smaller than the mode field diameter of each of the optical fiber transmission lines 50 and 52, it is possible to obtain a nonlinear coefficient large enough to reduce the length of the HNL-DSF.

According to this system, a gate operation based on the optical signal Es and the probe light Eprobe can be performed in the optical gate device 46, and the converted optical signal Ec obtained by wavelength conversion applied to the optical signal Es from the first optical fiber transmission line 50 according to the gate operation can be transmitted by the second optical fiber transmission line 52.

Although not shown, one or more optical amplifiers may be arranged along an optical path including the optical fiber transmission lines 50 and 52. In the case that an erbium doped fiber amplifier (EDFA) is used as each optical amplifier, ASE noise is generated in each optical amplifier and accumulated along the optical path. According to the system shown in FIG. 10, however, the SNR can be improved in accordance with the above-mentioned principle of noise suppression in the optical gate device 46.

While the optical gate device 46 is used as a repeater in this preferred embodiment, an optical gate device may be provided in the receiving station 56, thereby improving eye opening of the detected signal.

Although not shown, the system shown in FIG. 10 may further has a dispersion compensator for compensating for dispersion of at least one of the optical fiber transmission lines 50 and 52. The dispersion compensator provides dispersion having a sign opposite to the sign of the dispersion of each optical fiber transmission line, for example. The absolute value of the dispersion provided by the dispersion compensator is adjusted so that a receiving condition in the receiving station 56 becomes optimum. The use of the dispersion compensator allows suppression of chromatic dispersion occurring in each optical fiber transmission line, thereby achieving long-haul transmission.

Figure 11:
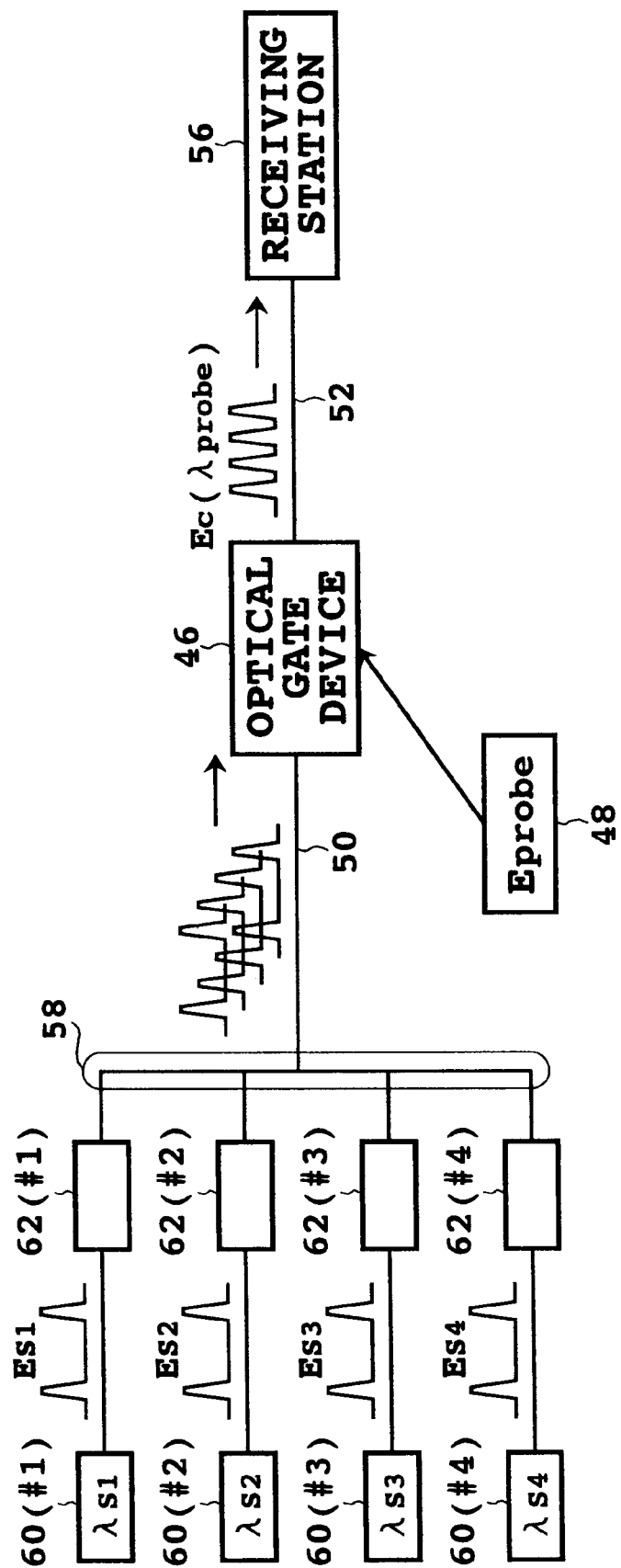
FIG. 11 is a block diagram showing a second preferred embodiment of the system according to the present invention.

FIG. 11 is a block diagram showing a second preferred embodiment of the system according to the present invention. In this preferred embodiment, an input end of a first optical fiber transmission line 50 is connected to an optical multiplexer 58. Four channels of optical signals Es1, Es2, Es3, and Es4 respectively transmitted from four optical transmitters 60 (#1, #2, #3, and #4) are supplied respectively through four optical delay circuits 62 (#1, #2, #3, and #4) to the optical multiplexer 58. In the optical delay circuits (#1 to #4), the optical signals Es1 to Es4 are adjusted in position along a time axis.

The optical signals Es1, Es2, Es3, and Es4 have wavelengths $\lambda s1$, $\lambda s2$, $\lambda s3$, and $\lambda s4$, respectively, which are different from each other. The optical signals Es1 to Es4 are obtained by intensity modulation by short pulses each having a pulse duration sufficiently shorter than a data repetition time T. These optical signals Es1 to Es4 are shifted sequentially by T/4 by the optical delay circuits 62 (#1 to #4). Accordingly, a wavelength division multiplexed signal including the optical signals Es1 to Es4 shifted along the time axis is output from the optical multiplexer 58.

When the wavelength division multiplexed signal is supplied to the optical gate device 46, all the wavelengths of the four channels are converted into the wavelength $\lambda$probe of the probe light. Accordingly, the converted optical signal to be output from the optical gate device 46 to the optical fiber transmission line 52 becomes a time division multiplexed signal.

Thus, according to the system shown in FIG. 11, a wavelength division multiplexed signal can be converted into a time division multiplexed signal.

While the four-channel wavelength division multiplexed signal is used in this preferred embodiment, the number of channels is not limited to four. For example, in the case that an N-channel (N is an integer greater than 1) wavelength division multiplexed signal is used, an N-channel time division multiplexed signal can be obtained. In this case, N optical delay circuits are used, and the time shift therebetween is set to T/N.

Figure 12:
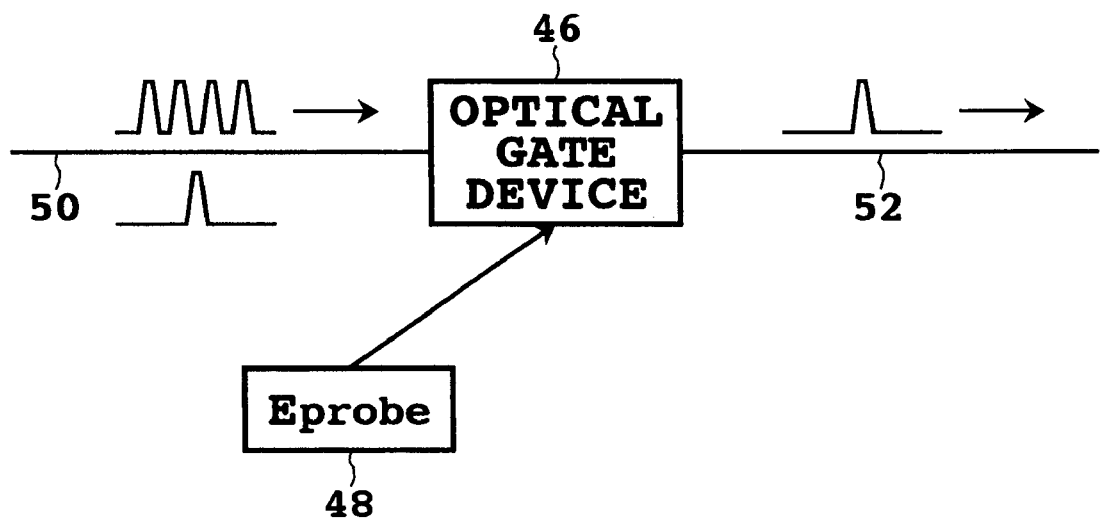
FIG. 12 is a block diagram showing a third preferred embodiment of the system according to the present invention.

FIG. 12 is a block diagram showing a third preferred embodiment of the system according to the present invention. In this preferred embodiment, the time division multiplexed signal obtained in the system shown in FIG. 11 is supplied to an optical gate device 46 by a first optical fiber transmission line 50, and probe light given by optical pulses synchronized with any channel of the time division multiplexed signal is supplied from a probe light source 48 to the optical gate device 46. With this configuration, an optical signal of only the channel synchronous with the probe light is converted into a converted optical signal, so that a demultiplexing or add/drop operation for the time division multiplexed signal can be performed.

According to the present invention as described above, it is possible to provide an optical gate device allowing the use of a relatively short optical fiber as a nonlinear optical medium, and also to provide a manufacturing method for the device and a system including the device.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A device comprising:

a first optical coupler including first and second optical paths directionally coupled to each other;

a loop optical path for connecting said first and second optical paths, said loop optical path including an optical fiber as a nonlinear optical medium;

a second optical coupler including a third optical path directionally coupled to said loop optical path, said optical fiber having a nonlinear coefficient large enough to reduce the length of said optical fiber to such an extent that said optical fiber has a polarization maintaining ability;

probe light having a first wavelength is supplied to said first optical path;

an optical signal having a second wavelength different from said first wavelength is supplied to said third optical path;

a converted optical signal having said first wavelength and synchronous with said optical signal is output from said second optical path;

an optical bandpass filter connected to said third optical path and having a pass band including said second wavelength; and an optical band-rejection filter connected to said third optical path and having a rejection band including said first wavelength.

2. A device according to claim 1, wherein said optical fiber includes a core doped with GeO2 and a clad doped with fluorine.

3. A device according to claim 1, wherein:

said optical fiber comprises a single-mode fiber;

said single-mode fiber having a mode field diameter smaller than the mode field diameter of a single-mode fiber used as a transmission line.

4. A device according to claim 1, further comprising an optical bandpass filter connected to said second optical path and having a pass band including said first wavelength.

5. A device according to claim 1, further comprising an optical band-rejection filter connected to said second optical path and having a rejection band including said second wavelength.

6. A device according to claim 1, further comprising:

detecting means connected to said second optical path for detecting the power of said converted optical signal; and means for controlling the power of at least one of said optical signal and said probe light so that the power detected by said detecting means is increased.

7. A device according to claim 1, further comprising:

detecting means connected to said first optical path for detecting the power of light having said first wavelength output from said first optical path in a direction opposite to the propagation direction of said probe light; and means for controlling the power of at least one of said optical signal and said probe light so that the power detected by said detecting means is reduced.

8. A device according to claim 1, wherein:

said optical fiber comprises first and second polarization maintaining fibers;

said first and second polarization maintaining fibers being spliced to each other so that the principal axes of said first and second polarization maintaining fibers orthogonally intersect each other.

9. A manufacturing method for a device having a first optical coupler including first and second optical paths directionally coupled to each other, a nonlinear optical medium for forming a loop optical path connecting said first and second optical paths, and a second optical coupler including a third optical path directionally coupled to said loop optical path, said method comprising:

cutting an optical fiber into a plurality of sections; and arranging said plurality of sections and joining them together so that a conversion band by a third-order nonlinear effect using said nonlinear optical medium becomes a maximum, thereby obtaining said nonlinear optical medium, wherein said arranging includes measuring the dispersions of said plurality of sections and said plurality of sections are arranged so that any of said sections having less variations in zero dispersion wavelength are located near both ends of said nonlinear optical medium.

10. A method according to claim 9, wherein at least a part of said plurality of sections is joined so that the positive and negative signs of the dispersions of said at least a part become alternate.

11. A manufacturing method for a device having a first optical coupler including first and second optical paths directionally coupled to each other, a nonlinear optical medium for forming a loop optical path connecting said first and second optical paths, and a second optical coupler including a third optical path directionally coupled to said loop optical path, said method comprising:

measuring a deviation in zero-dispersion wavelength of an optical fiber;

cutting said optical fiber into a plurality of sections when said deviation exceeds a predetermined range, and making the deviation in zero-dispersion wavelength of each of said sections fall within said predetermined range; and selecting said optical fiber or said sections having substantially the same zero-dispersion wavelength and joining said selected sections, thereby obtaining said nonlinear optical medium.

12. A device made by the process comprising:

cutting an optical fiber into a plurality of sections; and arranging said plurality of sections and joining them together so that a conversion band by a third-order nonlinear effect using a nonlinear optical medium becomes a maximum, thereby obtaining said nonlinear optical medium, wherein said arranging includes measuring dispersions of said plurality of sections, and said plurality of sections are arranged so that any of said sections having less variations in zero dispersion wavelength are located near both ends of said nonlinear optical medium.

13. A device made by the process comprising:

measuring a deviation in zero-dispersion wavelength of an optical fiber;

cutting said optical fiber into a plurality of sections when said deviation exceeds a predetermined range, and making the deviation in zero-dispersion wavelength of each of said sections fall within said predetermined range; and selecting said optical fiber or said sections having substantially the same zero-dispersion wavelength and joining said selected sections, thereby obtaining a nonlinear optical medium.

* * * * *